(No Model.)

C. P. ELLIS.
NUT LOCK.

No. 590,454. Patented Sept. 21, 1897.

*Fig. 6.* *Fig. 3.* *Fig. 7.*

*Fig. 4.* *Fig. 5.*

WITNESSES

INVENTOR
Charles P. Ellis
by Bakewell & Bakewell
his Attorneys.

UNITED STATES PATENT OFFICE.

CHARLES P. ELLIS, OF FRANKLIN, PENNSYLVANIA.

NUT-LOCK.

SPECIFICATION forming part of Letters Patent No. 590,454, dated September 21, 1897.

Application filed December 1, 1896. Serial No. 614,040. (No model.)

*To all whom it may concern:*

Be it known that I, CHARLES P. ELLIS, of Franklin, in the county of Venango and State of Pennsylvania, have invented a new and useful Improvement in Nut-Locks, of which the following is a full, clear, and exact description, reference being had to the accompanying drawings, forming part of this specification, in which—

Figure 1:
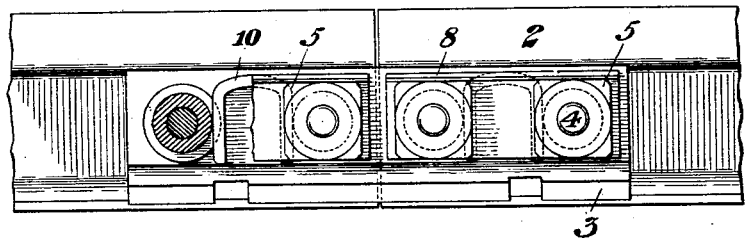
Figure 2:
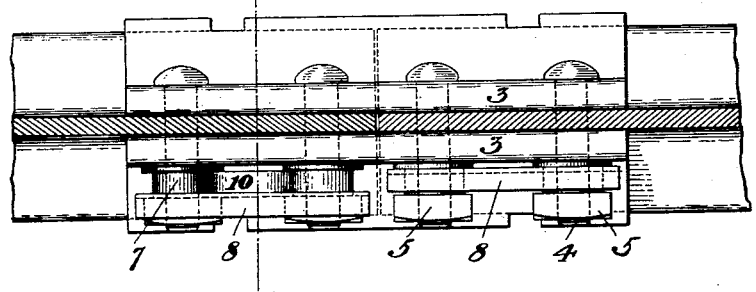
Figure 2:
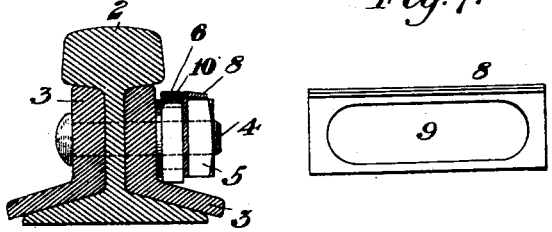
Figure 2:
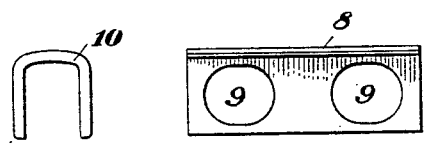

Figure 1 is a side elevation partially broken away. Fig. 2 is a plan view. Fig. 3 is a cross-section on the line III III of Fig. 2. Figs. 4 and 5 are respectively the key and lock detached, and Figs. 6 and 7 are modified forms of Fig. 5.

Like symbols of reference indicate like parts.

My invention relates to that class of nut-locks in which two or more nuts are locked in series and themselves carry and support the lock, and it is designed to afford a simple and effective means for locking the nuts without injuring the same or parts thereof.

In the drawings, 2 represents the rails, 3 the fish-plate, 4 the bolts with nuts 5 thereon and washers 6 interposed between the fish-plate and reduced portions or collars 7 of the nuts.

8 represents the lock, riding upon and retained by the collars 7. The collars 7 are of a length not less than the width of the angle portion of the lock 8, which, as shown in Fig. 3, has a lateral flange adapted to fit upon the flat sides of two adjacent nuts and to hold them from turning. The lock has bolt-holes 9 of sufficient diameter to fit upon the reduced inner portions of the nuts. The holes are preferably elongated laterally to permit them to be fitted easily without necessity of their centers registering with the centers of the bolt-holes in the rails and fish-plates and to permit of slight lateral movement of the bolts without injury to the lock.

10 represents a key or wedge, preferably of U shape, as shown in Fig. 4, which serves to retain the lock in engagement with the nuts.

In Figs. 6 and 7 I show modified forms of the lock.

The operation of my device is as follows: The bolts 4 being inserted through the registering holes in the rail 2 and fish-plate 3 the washers 6 are placed thereon. The lock 8 is then placed in position, the flange thereof extending outwardly from the rail and the bolts passing through the holes 9 in said lock. The nuts are then screwed upon the bolts and the reduced parts or collars 7 directed toward the rail. When the nuts are screwed home, the position of the various parts will be as shown in the right-hand position of Fig. 2. The lock is then moved outwardly, so as to bring its flange over the square portion of the two adjacent nuts, and a key or wedge 10 is inserted between the lock and the washers 6, so as to hold the lock in position and to prevent its withdrawal therefrom. The key or wedge 10 may be of any suitable shape or material, preferably of a strip of metal bent to U shape, as shown in Fig. 4, the thickness of the metal being sufficient to fit neatly in the space between the washer and lock. The nuts may be unlocked by removing the key or wedge and then pushing back the lock so as to disengage its flange from the nuts.

Many changes may be made in the construction and arrangement of the various parts by the skilled mechanic without departure from my invention as defined in the claims.

Any form of washer may be used, or they may be omitted where the holes in the fish-plate do not require them or where the side of the fish-plate is flush with the side of the tread of the rail.

The lock may be changed to suit the requirements of individual cases.

The flange may be applied to the top or bottom face of nuts or may be modified, as shown in Figs. 6 and 7.

I do not limit the use of my device to rails alone, since it is adaptable to any article having nuts and bolts in series of two or more.

The advantages of my invention will be appreciated by those skilled in the art to which it relates. Its parts are few in number and simple in construction, thereby admitting of a great saving in the original cost thereof. It admits readily of unlocking without injury to any of its parts, a feature not well provided for in devices heretofore known and one of great economic importance. No special tools nor skill are required in placing it in position or in removing it.

I claim—

1. A nut-lock consisting of an angled plate carried and retained upon nuts having a reduced cylindrical portion, adapted to engage said nuts laterally, and a removable wedge for retaining it in engagement therewith.

2. In a nut-lock, the combination of nuts 5, screwed upon bolts 4 into contact with washers 6, the angled plate 8 carried upon the reduced portion of said nuts, and the filler-block 10 inserted between said angled plate 8 and washers 6.

In testimony whereof I have hereunto set my hand.

CHARLES P. ELLIS.

Witnesses:
FREDERICK B. BLACK,
CYRUS S. MARK.